United States Patent
Hata et al.

[11] Patent Number: 5,505,761
[45] Date of Patent: Apr. 9, 1996

[54] PROCESS FOR PREPARING METALLIC CADMIUM POWDER

[75] Inventors: Yoshimi Hata; Masamoto Sasaki; Junichirou Tanaka; Hirohisa Senzaki; Morimasa Sumida, all of Takehara; Masaharu Onoue, Shimonoseki, all of Japan

[73] Assignee: Mitsui Mining & Smelting Co., Ltd., Tokyo, Japan

[21] Appl. No.: 185,849

[22] PCT Filed: Nov. 6, 1992

[86] PCT No.: PCT/JP92/01447

§ 371 Date: Jan. 25, 1994

§ 102(e) Date: Jan. 25, 1994

[87] PCT Pub. No.: WO93/24262

PCT Pub. Date: Dec. 9, 1993

[30] Foreign Application Priority Data

May 29, 1992 [JP] Japan .................................... 4-161885

[51] Int. Cl.⁶ .............................. B22F 9/12; H01M 4/44
[52] U.S. Cl. .............................. 75/367; 75/669; 429/222
[58] Field of Search ............................ 75/331, 338, 367, 75/669, 245; 429/222

[56] References Cited

U.S. PATENT DOCUMENTS

| | | | |
|---|---|---|---|
| 3,890,159 | 6/1975 | Thornton | 429/222 |
| 4,414,303 | 11/1983 | Williamson et al. | 429/222 |
| 5,199,975 | 4/1993 | Gunjishima et al. | 75/669 |

FOREIGN PATENT DOCUMENTS

| | | | |
|---|---|---|---|
| 3-153803 | 7/1991 | Japan | 75/367 |
| 5-209208 | 8/1993 | Japan | 75/367 |

*Primary Examiner*—George Wyszomierski
*Attorney, Agent, or Firm*—Bucknam and Archer

[57] ABSTRACT

A process for preparing a metallic cadmium powder for use in a nickel-cadmium by heat melting metallic cadmium in an evaporator, introducing an inert gas into the evaporator to discharge cadmium vapor along with the inert gas into a cooler, and collecting the resulting metallic cadmium powder, wherein the process condition is regulated such that at least one of the following conditions (1) and (2) can be satisfied:

(1) the amount of the inert gas flow introduced into the evaporator is at least 30 Nl/g of cadmium vapor while the direction of introducing the inert gas into the evaporator is set against the surface of the molten cadmium; and (2) the temperature of the molten cadmium in the evaporator and the amount of the inert gas flow introduced into the evaporator are set such that the following formulae can be satisfied:

$$\log y \geq 8.8 \times 10^{-3} x - 5.3 \ (600 \leq x \leq 900), \text{ and}$$

$$\log y \geq 1.8 \times 10^{-3} x - 0.96 \ (330 \leq x \leq 600),$$

wherein x is the temperature (°C.) of the molten cadmium, and y is the flow rate (cm/sec) of the inert gas over the surface of said molten cadmium.

6 Claims, 4 Drawing Sheets

PROCESS FOR PREPARING METALLIC CADMIUM POWDER

TECHNICAL FIELD

The present invention relates to a process for preparing a high-activity metallic cadmium powder useful as the active material of a nickel-cadmium battery.

BACKGROUND ART

Cadmium oxide and cadmium hydroxide prepared through neutralization and formation treatment of cadmium nitrate have heretofore been predominantly used as the starting material of the negative active material of nickel-cadmium batteries.

The cadmium oxide or cadmium hydroxide, after being fixed through coating or impregnation therewith of a substrate, is usually reduced into metallic cadmium through partial charge thereof to an extent of about 30 to 40% of the capacitance of a negative electrode prior to the construction of the battery.

Since, however, such reduction of the cadmium oxide or cadmium hydroxide into metallic cadmium through partial charge of the former involves drawbacks in the operation such as the necessity of taking a series of complicated and troublesome steps of electrolysis, washing with water, drying, etc., there has been proposed preliminary addition of a metallic cadmium powder as part of the starting material of the negative active material with a view to obviating such drawbacks.

From necessity under such circumstances, there has been proposed the use of various metallic cadmium powders prepared as the negative active materials by respective known methods.

Examples of such metallic cadmium powders include one prepared by the atomization of molten cadmium with a high-pressure gas or liquid; one prepared by the evaporation and condensation method wherein molten cadmium is heated above the boiling point and then condensed in an oxygen-free cooler; one prepared by the so-called evaporation-in-gas method wherein metallic cadmium heated above the boiling point in a high-frequency induction furnace, a plasma furnace, a resistance furnace or the like is evaporated in an evaporator evacuated and then fed with argon gas, xenon gas, nitrogen gas, etc., alone or in combination, to adjust the internal pressure of the evaporator to a negative pressure of a few to hundreds of Torr, and is then stuck to the wall of the evaporator, a cooling plate or the like to be collected in the form of a metallic cadmium powder; one prepared by the electrolysis method; one prepared by the substitutive precipitation method; and one prepared through mechanical pulverization.

Each of the metallic cadmium powders respectively prepared by the foregoing methods is very fine but still too large in particle size to act as the active material of the battery, and hence is low in the utilization factor of the active material to make it difficult to put it into practical use. It is well known that a metallic cadmium powder to be used as the negative active material generally has the utilization factor of the active material affected by the shape and size of the particles thereof. More specifically, a metallic cadmium powder having an uneven surface provides a more excellent result as regards the utilization factor as the active material than one having a wide and configurationally simple smooth surface.

According to the above-mentioned evaporation and condensation method well known as one of the conventional methods of preparing a metal powder, the resulting metallic cadmium powder is as large as a few to about 10 µm in particle diameter, and is in the form of nearly spherical particles each with a smooth surface resulting from the surface tension in a molten state. Such a spherical or tetragonal metallic cadmium powder has a small surface area because of the smooth surface, and hence is low in electrical activity to overcome the problem of a low utilization factor in discharge.

In order to increase the surface area of such a spherical particle, the diameter of the particle must be made as small as possible. According to the conventional evaporation and condensation method, however, cadmium is evaporated from molten metallic cadmium sufficiently heated and then formed into particles in a state of vigorous evaporation of cadmium wherein evaporated particles repeatedly collide and fuse with each other to form droplets by the action of the surface tension thereof. In such a stage, it is considerably difficult to control the particle diameter to be below a submicron level. Accordingly, the specific surface area of the particle is at best 0.2 to 0.6 $m^2/g$ or smaller, and the utilization factor as the active material is as low as about 20 to 40% to render the particles useless as the active material of the battery from the practical point of view.

Further, metallic cadmium powders respectively prepared according to other methods, though as very fine as submicron or smaller particles, are obtained in very low yields to pose problems such as the utter industrial inapplicability of the methods, the high cost of the powders, and hence the difficulty of use thereof from an economical aspect despite the satisfactory utilization factors as the active materials.

SUMMARY OF THE INVENTION

An object of the present invention is to achieve improvements in the foregoing problems to provide a process for preparing a metallic cadmium powder having a high activity as the active material of a nickel-cadmium battery, which process is sufficiently of practical industrial use.

The above-mentioned object of the present invention can be accomplished by introducing an inert gas into an evaporator above a specific amount of flow and in a specific direction, or by maintaining a specific relationship between the temperature of molten cadmium in an evaporator and the amount of an inert gas flow introduced into the evaporator.

More specifically, the process of the present invention for preparing a metallic cadmium powder for use in a nickel-cadmium battery comprises heat-melting metallic cadmium in an evaporator, introducing an inert gas into the evaporator to discharge cadmium vapor along with the inert gas into a cooler, and collecting the resulting metallic cadmium powder, and the process condition is regulated such that at least one of the following conditions (1) and (2) can be satisfied:

(1) the amount of the inert gas flow introduced into the evaporator is at least 30 Nl/g of cadmium vapor while the direction of introducing the inert gas into the evaporator is set against the surface of the molten cadmium, and (2) the temperature of the molten cadmium in the evaporator and the amount of the inert gas flow introduced into the evaporator are set such that the relationship represented by the following formulae can be satisfied:

$$\log y \geq 8.8 \times 10^{-3} x - 5.3 \ (600 \leq x \leq 900),$$

and $$\log y \geq 1.8 \times 10^{-3} x - 0.96 \ (330 \leq x \leq 600),$$

wherein x is the temperature (°C.) of the molten cadmium, and y is the flow rate (cm/sec) of the inert gas over the surface of the molten cadmium.

The present invention will now be specifically described with reference to the accompanying drawings.

FIG. 1 is a schematic diagram of an apparatus for use in carrying out the process for preparing a metallic cadmium powder according to the present invention. The apparatus of FIG. 1 consists of an inert gas heater 1, a heater 2, an evaporator 3, a cooler 4, powder collectors 5 and 6, a gas-circulating pump 7, and a gas conduit 8.

In FIG. 1, an ingot of metallic cadmium is placed in the evaporator 3, wherein cadmium is heat melted and then evaporated with the heater 2. Although the temperature of molten cadmium in this step is not particularly restricted, it must be of course equal to at least the melting point (321° C.) of cadmium in order to melt the ingot of the metallic cadmium, and is preferably in the range of 330° to 900° C., still preferably 500° to 800° C., because of the necessity of controlling the amount of cadmium being evaporated within a given range.

On the other hand, it is preferable to preliminarily heat an inert gas such as nitrogen gas with the inert gas heater 1 before the introduction of the inert gas into the evaporator 3. Examples of the inert gas include nitrogen gas, argon gas, and carbon dioxide. The inert gas may be passed through the evaporator 3 either only once or repeatedly in circulation as illustrated in FIG. 1. Using the inert gas in such a way aims at preventing unnecessary cadmium oxide from being yielded through an easy reaction of cadmium vapor with a small amount of oxygen.

In the present invention, it is desirable that the amount of the inert gas flow introduced into the evaporator be set at at least 30 Nl/g of cadmium vapor. When this amount is lower than 30 Nl/g of cadmium vapor, the resulting cadmium powder cannot have a high utilization factor as the active material. Herein, the amount (g) of cadmium vapor is one calculated based on the ratio of the saturated vapor pressure of cadmium at a set temperature of molten cadmium to the vapor pressure of cadmium at the boiling point at a pressure of 1 atm while using as the standard the amount of a cadmium powder obtained at the boiling point of cadmium at a pressure of 1 atm.

In the conventional methods of preparing a metallic cadmium powder, the amount of an inert gas flow is considerably below the range specified in the present invention. In the method disclosed in Japanese Patent Laid-Open Gazette No. Hei 3-153803 (153803/1991), for example, the amount of an inert gas flow is set in the range of 0.1 to 20 Nl/g of cadmium vapor. With attention paid to this amount, it has been found out in the present invention that a cadmium powder obtained at an increased amount of an inert gas flow is composed of uneven and irregular particles, or at least six-sided polygonal particles, thus having a high utilization factor in discharge.

In the present invention, it is desirable that the direction of introducing the inert gas into the evaporator 3 be set against the surface of the molten cadmium so that the flow path of the inert gas introduced into the evaporator 3 is mostly adjacent to the surface of the molten cadmium. This is believed to be because metallic cadmium particles formed from evaporated cadmium collide and coalesce with each other to increase in size and turn spherical where the direction of introducing the inert gas into the evaporator is upward against a space above the bath of molten cadmium.

In the present invention, it is also desirable that the temperature of molten cadmium in the evaporator and the amount of the inert gas flow introduced into the evaporator be adjusted to fall within a specific area in order to prevent metallic cadmium particles formed from evaporated cadmium from colliding and coalescing with each other to increase in size and turn spherical. Specifically, the adjustment of the temperature of the molten cadmium serves to control the amount of cadmium vapor evolved to prevent the metallic cadmium particles from colliding and coalescing with each other, while the adjustment of the amount of the inert gas flow serves to prevent the metallic cadmium particles from colliding and coalescing with each other due to the residence thereof in the evaporator 3. Accordingly, when the extent of evaporation of cadmium vapor is high enough to raise a fear of mutual collision and coalescence of metallic cadmium particles, an increase in the flow rate of the inert gas and/or a fall in the temperature of molten cadmium will suffice.

It is desirable that the relationship between the temperature of molten cadmium and the amount of the inert gas flow be set so as to fall in the area illustrated in FIG. 2 and represented by the following formulae:

$$\log y \geq 8.8 \times 10^{-3} x - 5.3 \quad (600 \leq x \leq 900),$$

and $$\log y \geq 1.8 \times 10^{-3} x - 0.96 \quad (330 \leq x \leq 600),$$

wherein x is the temperature (°C.) of the molten cadmium, and y is the flow rate (cm/sec) of the inert gas over the surface of the molten cadmium.

A metallic cadmium powder prepared under the conditions falling in the above-mentioned area has a very high utilization factor as the active material.

Thus, according to the present invention, it is desirable to determine the conditions of preparation of a metallic cadmium powder, including the temperature of the molten cadmium and the flow rate of the inert gas adjusted as described above, while making reference to the results of observing the shape of the resultant metallic cadmium particles under a scanning electron microscope.

Subsequently, the cadmium vapor is guided to the cooler 4 communicating with the evaporator 3 to cool the cadmium vapor into powdery particles, which are then collected in the powder collectors 5 and 6. Since the metallic cadmium powder is open to oxidation as mentioned hereinbefore, it is necessary to fill the cooler 4 and the powder collectors 5 and 6 with an atmosphere of the inert gas.

Accordingly, it is desirable that the inert gas heated with the inert gas heater 1 be circulated through the evaporator 3, the cooler 4, the powder collectors 5 and 6, and the gas conduit 9 by means of the gas-circulating pump 8 as illustrated in FIG. 1.

BEST MODES FOR CARRYING OUT THE INVENTION

The following Examples will specifically illustrate the present invention.

Example 1

Figure 1:
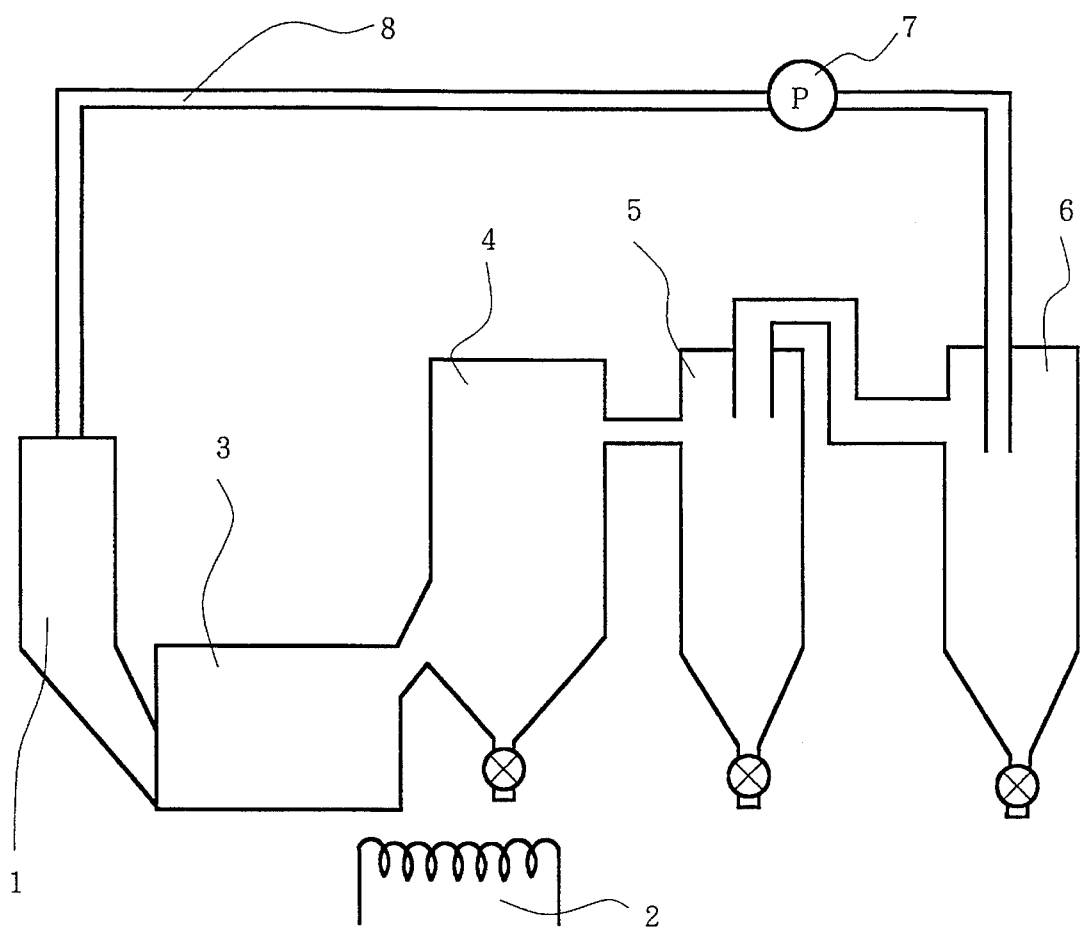
FIG. 1 is a schematic diagram of the apparatus for use in carrying out the process for preparing a metallic cadmium powder according to the present invention.
Figure 2:
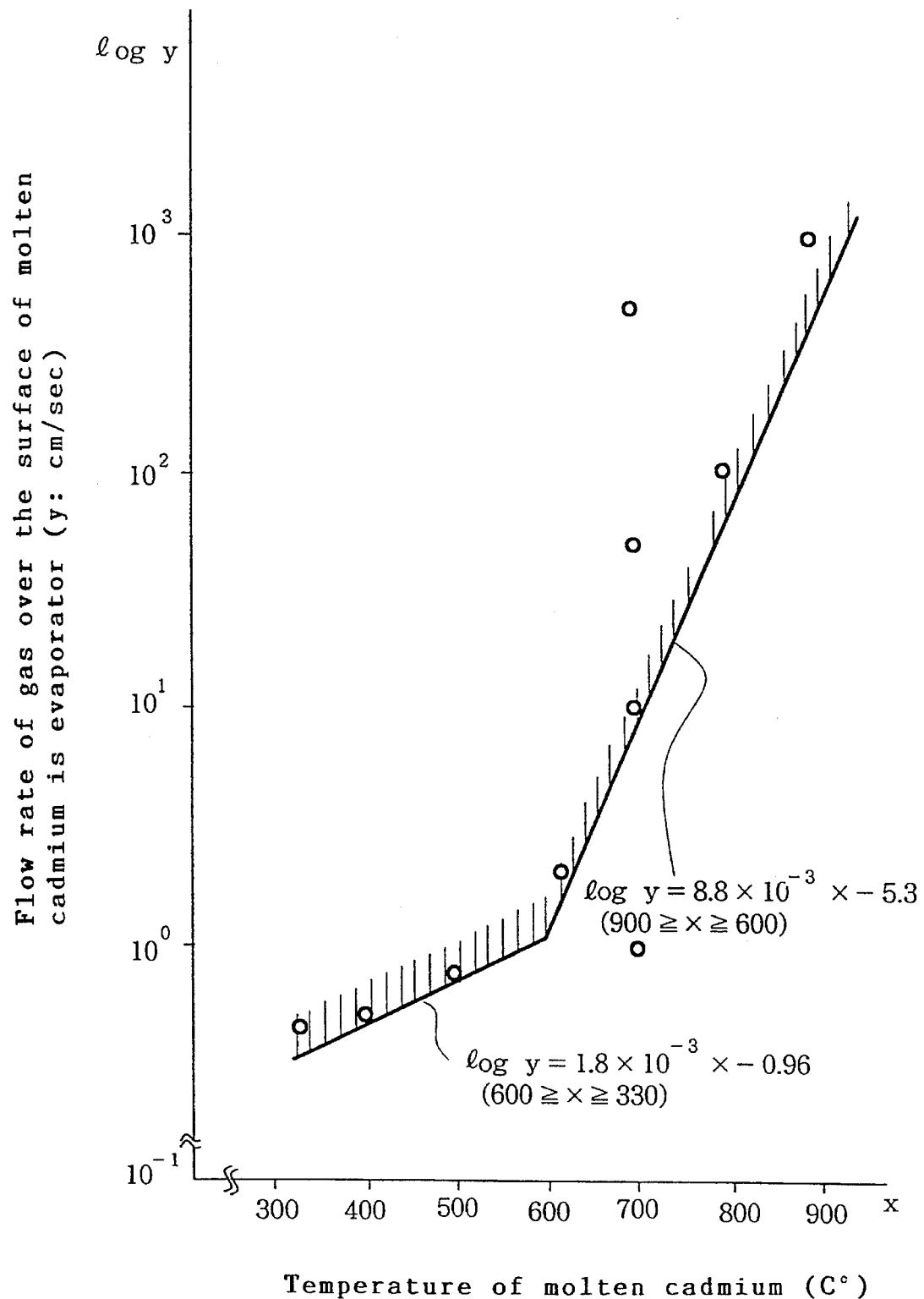
FIG. 2 is a graph showing the relationship between the temperature (°C.) of molten cadmium and the flow rate (cm/sec: on a logarithmic scale) of an inert gas over the surface of the molten cadmium.

The evaporator 3 of the apparatus illustrated in FIG. 1 was charged with 10 kg of an ingot of metallic cadmium, which was then heat melted. The whole system had been preliminarily filled with nitrogen gas to free the system of unnecessary oxygen.

The temperature of the molten cadmium in the evaporator 3 was elevated to 700° C. Immediately the pump 7 was started up to initiate the circulation of the nitrogen gas.

When the temperature of the molten cadmium in the evaporator 3 became substantially constant, the flow rate of the nitrogen gas circulated with the pump 7 was adjusted. The amount of the nitrogen gas flow introduced into the evaporator 3 was set at 50 Nl/g of cadmium vapor, while the direction of introducing the nitrogen gas into the evaporator 3 was set against the surface of the molten cadmium. Further, the flow rate of the nitrogen gas over the surface of the molten cadmium in the evaporator 3 was set at 30 cm/sec. It is to be noted that after the start-up of the apparatus, samples were taken out of the powder collectors 5 and 6 to observe the external shapes of the particles of the samples under a scanning electron microscope.

The resulting microscopic photograph (magnification: ×6,000) of the metallic cadmium powder was examined and it was found that the metallic cadmium powder thus obtained was composed of irregular polygonal particles.

The utilization factor of this metallic cadmium powder as the active material of the battery was determined. The determination was conducted by coating a nickel substrate (2×3 cm) with 1 g of the metallic cadmium powder, combining the coated substrate with a preliminarily prepared nickel positive electrode in a 27% solution of potassium hydroxide having a liquid temperature of 20° C. to form a battery, and discharging electricity from the battery at a constant current of 180 mA. The result is shown in Table 1.

The utilization factor as mentioned herein is a value calculated according to the following equation:

utilization factor = [quantity of electricity (mAh) actually taken out of 1 g of metallic cadium powder/theoretical quantity of electricity (477 mAh) per g of cadium] × 100(%).

Examples 2 to 8 and Comparative Examples 1 and 2

Substantially the same procedure as that of Example 1 was repeated to obtain a metallic cadmium powder except that the temperature of the molten cadmium in the evaporator, the amount of nitrogen gas flow over the surface of the molten cadmium, the direction of introducing the nitrogen gas into the evaporator, and the flow rate of the nitrogen gas over the surface of the molten cadmium were set as listed in Table 1.

The utilization factor of the obtained metallic cadmium powder as the active material of the battery was determined according to the same procedure as that of Example 1. The results are given in Table 1.

According to the observation of the external shape of the particles under a scanning electron microscope, metallic cadmium powders obtained in Examples 2 to 8 were composed of uneven particles, or at least six-sided polygonal particles. while metallic cadmium powders obtained in Comparative Examples 1 and 2 were composed of spherical particles.

TABLE 1

| | Inert gas introduced (nitrogen gas) | | | | |
|---|---|---|---|---|---|
| Ex. and Comp. Ex. | Temp. of molten cadmium (°C.) | Direction of introduction | Amt. of flow (Nl/g of Cd vapor) | Flow rate (cm/sec) | Utilization factor (%) |
| Ex. 1 | 700 | against surface of melt | 50 | 30 | 65 |
| Ex. 2 | 700 | against surface of melt | 30 | 30 | 65 |
| Ex. 3 | 700 | against surface of melt | 100 | 30 | 65 |
| Ex. 4 | 700 | against surface of melt | 150 | 30 | 65 |
| Ex. 5 | 700 | against surface of melt | 50 | 10 | 65 |
| Ex. 6 | 700 | against surface of melt | 50 | 500 | 65 |
| Ex. 7 | 500 | against surface of melt | 30 | 0.7 | 65 |
| Ex. 8 | 400 | against surface of melt | 30 | 0.5 | 65 |
| Comp. Ex. 1 | 700 | against space above bath | 20 | 1.0 | 35 |
| Comp. Ex. 2 | 700 | against space above bath | 15 | 30 | 30 |

As is apparent from Table 1, it can be understood that the metallic cadmium powders obtained in Examples 1 to 8 while adjusting the amount of the inert gas flow in the specific range and setting the direction of introduction of the inert gas against the surface of the molten cadmium had a notably high utilization factor as compared with the metallic cadmium powders obtained in Comparative Examples 1 and 2 under the conditions departing from those mentioned above in connection with Examples 1 to 8.

Example 9

The evaporator 3 of the apparatus illustrated in FIG. 1 was charged with 10 kg of an ingot of metallic cadmium, which was then heat melted under the same conditions as those of Example 1.

When the temperature of the molten cadmium in the evaporator 3 became substantially constant, the flow rate of the nitrogen gas circulated with the pump 7 was adjusted. The amount of the nitrogen gas flow introduced into the evaporator 3 was set such that the flow rate of the nitrogen gas over the surface of the molten cadmium in the evaporator 3 was 50 cm/sec (1.699 on a logarithmic scale). After the start-up of the apparatus, samples were taken out of the powder collectors 5 and 6 to observe the external shapes of the particles of the samples under a scanning electron microscope as in Example 1.

Figure 3:
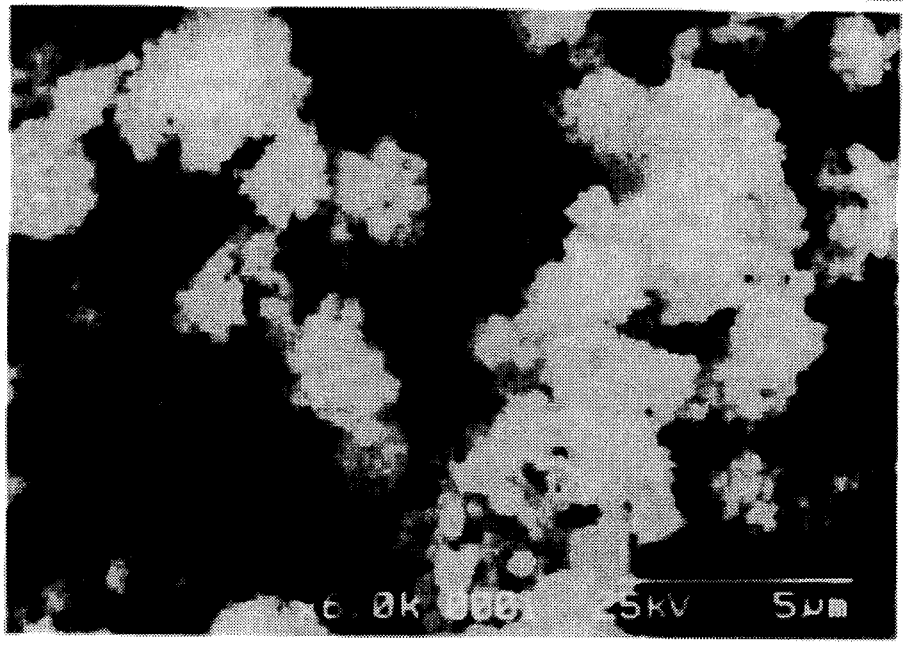
FIG. 3 is a microscopic photograph (×6,000) showing the shape of the particles of a metallic cadmium powder obtained in Example 9.

The resulting microscopic photograph (magnification: ×6,000) of the metallic cadmium powder is shown in FIG. 3. As is apparent from FIG. 3, it can be understood that the metallic cadmium powder thus obtained was composed of irregular polygonal particles.

The utilization factor of the obtained metallic cadmium powder as the active material of the battery was determined according to the same procedure as that of Example 1. The results are given in Table 2.

Examples 10 to 17 and Comparative Examples 3 and 4

Substantially the same procedure as that of Example 9 was repeated to obtain a metallic cadmium powder except that the temperature of molten cadmium in the evaporator and the amount of the nitrogen gas flow over the surface of the molten cadmium in the evaporator were set as listed in Table 2.

The utilization factor of the obtained metallic cadmium powder as the active material of the battery was determined according to the same procedure as that of Example 1. The results are given in Table 2.

Figure 4:
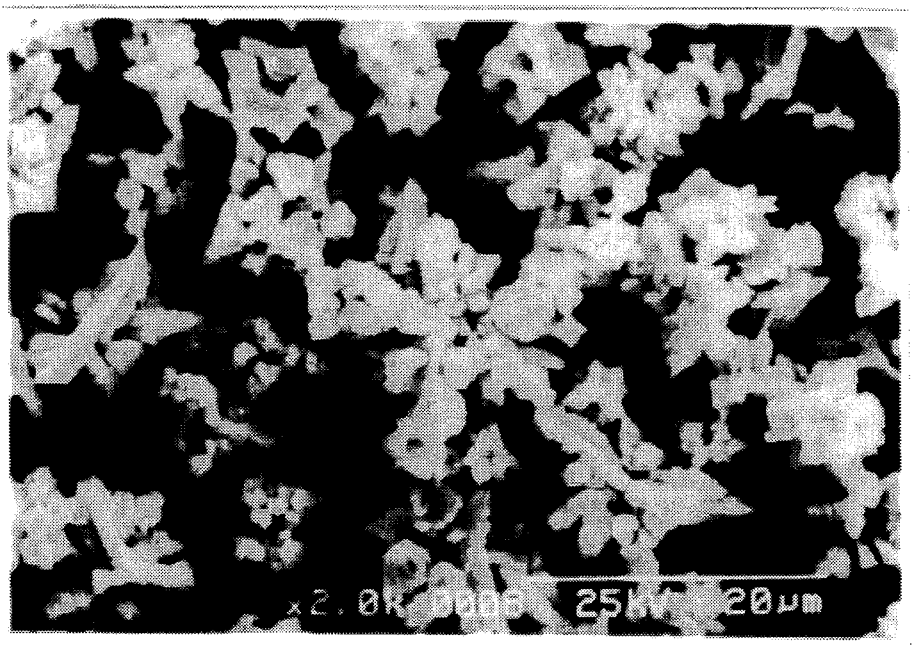
FIG. 4 is a microscopic photograph (×2,000) showing the shape of the particles of a metallic cadmium powder obtained in Example 11.
Figure 5:
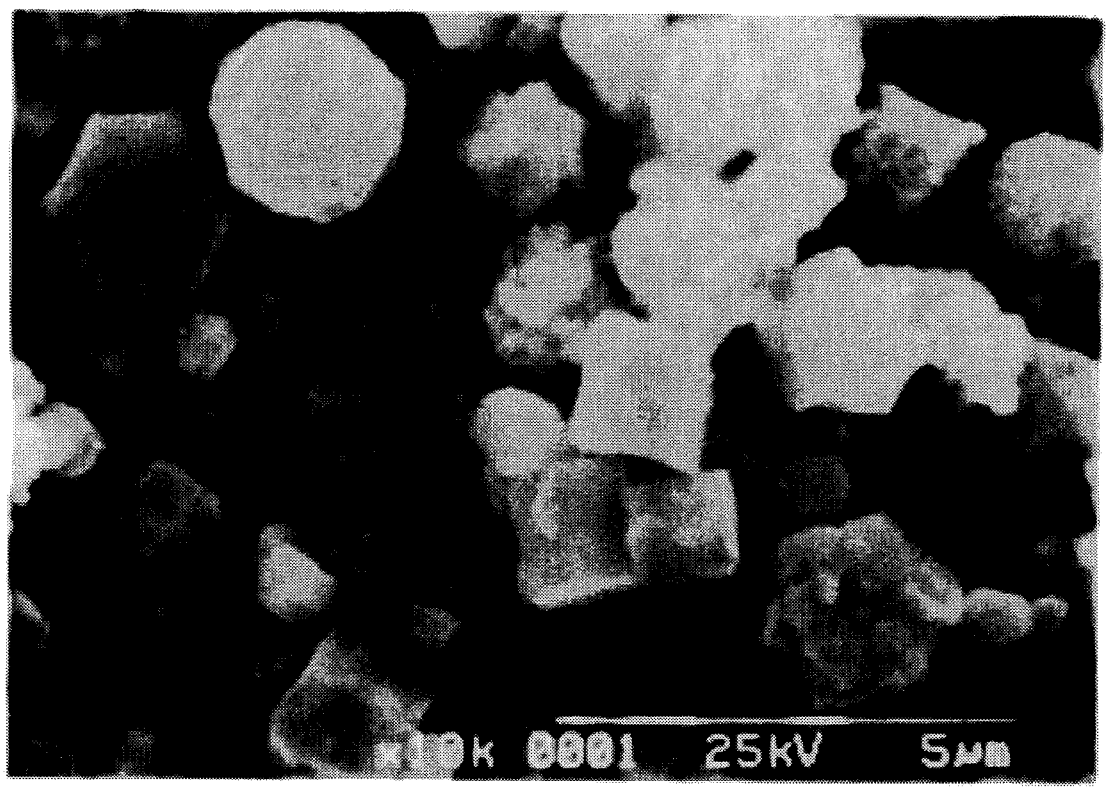
FIG. 5 is a microscopic photograph (×10,000) showing the shape of the particles of a metallic cadmium powder obtained in Example 13.

The external shapes of the particles of the metallic cadmium powders obtained in Examples 11 and 14 were observed under a scanning electron microscope in the same manner as that of Example 1. The resulting microscopic photographs are shown in FIGS. 4 and 5, respectively.

TABLE 2

| Ex. and Comp. Ex. | Temp. of molten cadmium (°C.) | Flow rate of nitrogen gas over surface of melt | | Utilization factor (%) |
|---|---|---|---|---|
| | | y (cm/sec) | log y | |
| Ex. 9 | 700 | 50 | 1.699 | 65 |
| Ex. 10 | 700 | 500 | 2.699 | 65 |
| Ex. 11 | 330 | 0.43 | −0.367 | 65 |
| Ex. 12 | 400 | 0.50 | −0.301 | 65 |
| Ex. 13 | 500 | 0.70 | −0.155 | 65 |
| Ex. 14 | 620 | 2.0 | 0.301 | 65 |
| Ex. 15 | 700 | 10 | 1.0 | 65 |
| Ex. 16 | 800 | 100 | 2.0 | 65 |
| Ex. 17 | 900 | 1000 | 3.0 | 65 |
| Comp. Ex. 3 | 700 | 1.0 | 0 | 35 |
| Comp. Ex. 4 | 700 | 0 | — | 30 |

As is apparent from Table 2, it can be understood that the metallic cadmium powders obtained in Examples 9 to 17 while setting the temperature of the molten cadmium and the flow rate of the inert gas in the specific areas had a notably high utilization factor as compared with the metallic cadmium powders obtained in Comparative Examples 3 and 4 under the conditions departing from those mentioned above in connection with Examples 9 to 17.

Industrial Applicability

A metallic cadmium powder obtained according to the present invention is composed of uneven and irregular particles, or at least six-sided polygonal particles, so that the surface area thereof is several times as large as those of conventional metallic cadmium powders and the electrical activity thereof is therefore so high as to heighten the utilization factor of the metallic cadmium powder as the active material in discharge. Such a high electrical activity cannot be secured in the case of the conventional spherical cadmium particles having smooth surfaces. The high activity of the metallic cadmium powder obtained according to the present invention results from the presence of many reactive sites on the surfaces of the particles of the metallic cadmium powder, the use of which therefore materializes a high-performance battery to a great industrial advantage.

What is claimed is:

1. A process for preparing a metallic cadmium powder for use in a nickel-cadmium battery, comprising the steps of:

melting metallic cadmium in an evaporator;

introducing an inert gas into said evaporator at an amount of flow of at least 30 Nl/g of cadmium vapor and in a direction set against the surface of the molten cadmium;

discharging cadmium vapor along with said inert gas into a cooler; and collecting the resulting metallic cadmium powder.

2. A nickel-cadmium battery comprising the metallic cadmium powder prepared by the process according to claim 1.

3. A metallic cadmium powder for use in a nickel-cadmium battery, which is composed of at least six-sided polyhedral particles.

4. A nickel-cadmium battery comprising the metallic cadmium powder according to claim 3.

5. A process of preparing metallic cadmium powder for use in a nickel-cadmium battery, consisting of the steps of:

melting metallic cadmium in an evaporator;

introducing an inert gas over the surface of said molten cadmium in an amount of at least 30 Nl/g of cadmium while the temperature of molten cadmium and the amount of said inert gas flow are set such that the following formulae are satisfied:

$$\log y \geq 8.8 \times 10^{-3} x - 5.3 \ (600 \leq x \leq 900), \text{ and}$$

$$\log y \geq 1.8 \times 10^{-3} x - 0.96 \ (330 \leq x \leq 600),$$

wherein x is the temperature (°C.) of said molten cadmium, and y is the flow rate (cm/sec) of said inert gas over the surface of said molten cadmium;

discharging cadmium vapor along with said inert gas into a condensation cooler; and collecting the resulting metallic cadmium powder.

6. A nickel-cadmium battery comprising the metallic cadmium powder prepared by the process according to claim 5.

* * * * *